United States Patent [19]

Hoeberigs

[11] Patent Number: 4,838,455

[45] Date of Patent: Jun. 13, 1989

[54] VENDING MACHINE FOR HEATED FOOD, NOTABLY COOKED FRENCH FRIES

[76] Inventor: Jean M. M. Hoeberigs, Grote Maagdenstraat 45, Sluis, Netherlands

[21] Appl. No.: 30,846

[22] PCT Filed: Jun. 17, 1986

[86] PCT No.: PCT/NL86/00016
§ 371 Date: Apr. 16, 1987
§ 102(e) Date: Apr. 16, 1987

[87] PCT Pub. No.: WO86/07648
PCT Pub. Date: Dec. 31, 1986

[30] Foreign Application Priority Data

Jun. 17, 1985 [BE] Belgium ............... 215202

[51] Int. Cl.$^4$ .......................................... A47J 37/00
[52] U.S. Cl. ........................................ 221/82; 99/348; 99/357; 221/150 A; 221/203; 366/231
[58] Field of Search ............. 221/82, 83, 96, 150 HC, 221/150 A, 203; 222/229, 349; 99/348, 357, 407, 409, 443 R, 323.6, 323.9; 366/231, 607

[56] References Cited

U.S. PATENT DOCUMENTS

| | | | |
|---|---|---|---|
| 239,269 | 3/1881 | Pearson | 366/231 X |
| 1,466,496 | 8/1923 | Whitehead | 366/231 X |
| 1,765,638 | 6/1930 | Trynoski | 366/231 |
| 2,201,655 | 5/1940 | Srodulski | 222/228 X |
| 2,831,517 | 4/1958 | Pouzoulet | . |
| 2,984,169 | 5/1961 | Bushway | 99/348 X |
| 3,712,507 | 1/1973 | Holt | 221/82 |
| 3,870,193 | 3/1975 | Schneider | 221/150 A |
| 4,060,587 | 11/1977 | Lewis | 366/607 X |
| 4,206,695 | 6/1980 | Cretors | . |
| 4,359,935 | 11/1982 | Murray | 221/150 A X |

FOREIGN PATENT DOCUMENTS

| 3047267 | 7/1982 | Fed. Rep. of Germany | 99/348 |
|---|---|---|---|
| 537754 | 7/1921 | France . | |

*Primary Examiner*—F. J. Bartuska
*Attorney, Agent, or Firm*—Cushman, Darby & Cushman

[57] ABSTRACT

There is described a vending machine for heated food portions, which includes a feeder device (1) for food portions (32) to be heated, a heating equipment (3) composed of a tray (13) wherein flexible free members (33) are moved, in order to stir the food, and a device (7) for discharging folded containers (12) to receive the heated food.

15 Claims, 5 Drawing Sheets

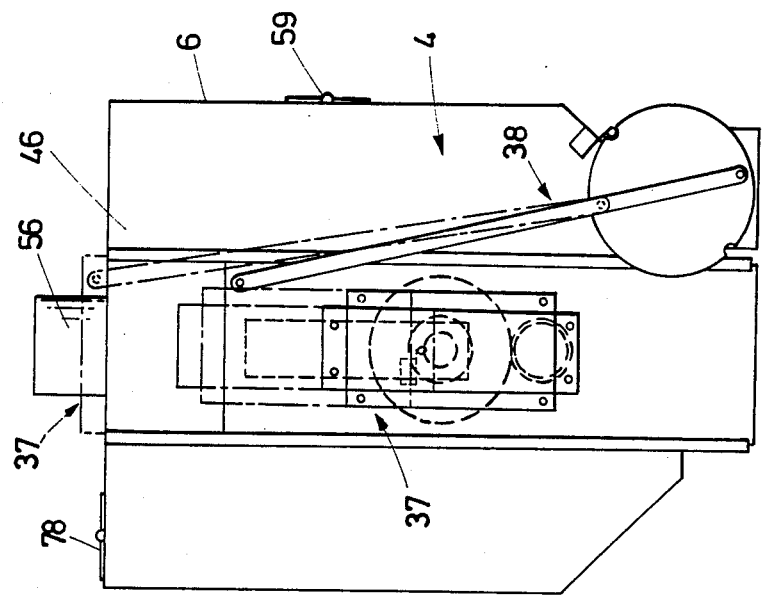
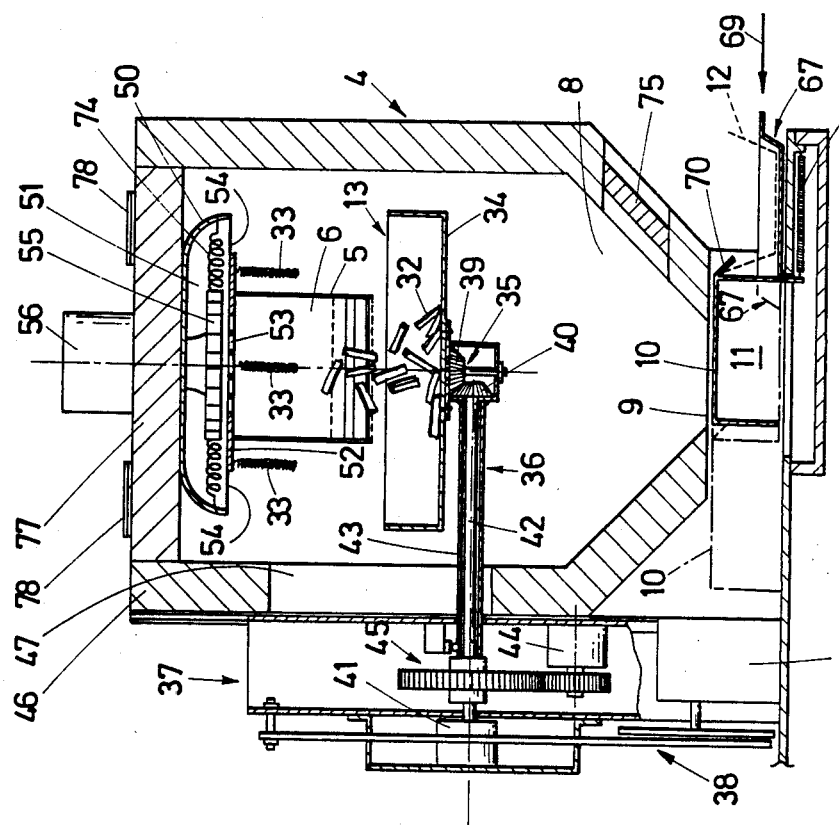

VENDING MACHINE FOR HEATED FOOD, NOTABLY COOKED FRENCH FRIES

This invention relates to an equipment for heating food, notably pre-cooked French fries.

It does more particularly pertain to an equipment built into a vending machine for heated food and mostly cooked French fries.

Due to the technical and safety problems encountered in equipments where heating and notably cooking food occurs in oil or fat, there has been considered for obviating such drawback, using as heating source, hot air and/or infrared radiation.

A known equipment of this kind comprises a substantially horizontal drum revolving about the axis thereof wherein the goods to be heated are constantly retained in movement during the heating operation.

Such an equipment has however for drawback that the food is raised to some height to fall back thereafter on a stack formed on the drum bottom. It is noted that when the food is comprised of French fries, such a relatively rough treatment often results in shredding same and as the fries pile up on the drum bottom, this does prevent homogeneously heating or cooking the French fries.

On the other hand, the drum volume is relatively large relative to the amount food being heated in a single operation, and heating is generally unefficient, in such a way that the cooking time required is rather long.

One of the essential objects of this invention is to obviate such drawbacks and notably to provide an equipment allowing to stir substantially continuously the food over a heating surface, while insuring a perfect distribution thereof on said surface, without any danger of damaging the food.

For this purpose, the heating equipment according to the invention comprises at least one tray wherein the food to be heated is fed, and flexible members hanging freely above said tray with the lower ends thereof contacting the tray bottom, means being provided to move said tray and members relative to one another, in such a way that the free lower ends of said members drag over the tray bottom and retain food to be heated constantly moving while stirring same and distributing the food substantially uniformly in the tray.

Advantageously, the tray has a substantially flat bottom.

In an advantageous embodiment of the invention, the tray is rotatably mounted about an axis lying substantially at right angle to the tray bottom by means of a driving mechanism.

In a particularly advantageous embodiment of the invention, the tray bottom is mounted on a mechanism for tilting about a substantially horizontal axis, while cooperating with said driving mechanism to allow subjecting the tray to a revolution about the axis at right angle to the bottom thereof during a tilting movement.

The invention further relates to a feeder device for food portions to a heating equipment, notably the above-described equipment.

Said device has for feature to comprise at least one storage cylinder open at both ends thereof and divided into compartments along substantially identical circular sectors, said cylinder being rotatable about a substantially vertical axis above a fixed disk which forms the compartment bottom, a recess being provided in said disk to allow emptying the food-containing compartments by bringing same in sequence above said recess by rotating said cylinder about the axis thereof.

The invention further pertains to a device for feeding containers which will contain food portions as provided by a food-processing equipment, notably a food-heating equipment, such as for heating pre-cooked French fries, which comprises at least one tank for storing superimposed containers, with an opening wherethrough said containers may be discharged one by one.

According to the invention, said device is so designed as to contain folded containers the side walls of which are folded-back inwards by forming elements in the shape of plates which are slightly bulging on the folded-back wall side, said opening being comprised of a slot provided sidewise in the tank with a size which corresponds substantially to the cross-section of the plate-shaped elements to allow removing same one by one through said opening, rests extending along the tank inner walls facing said opening, whereon the edges of that element to be removed bear and wherebetween comes to lie the bulging element portion, an extractor being provided level with said opening to push that element which bears on the rests outwardly of the tank, through said opening.

Finally the invention relates to a vending machine for heated food portions, notably cooked French fries portions. Said vending machine has notably for feature according to the invention, to comprise (a) a device for feeding portions from said food to be heated, lying inside a heat-insulated chamber, (b) a heating equipment for said food, arranged inside a chamber provided adjacent to said heat-insulated chamber and communicating therewith through an inlet opening provided with a closure member, (c) a feeder device for discharging containers to contain heated food portions supplied by said heating equipment, (d) a collecting chamber provided underneath said equipment, wherein the heated food is collected and the bottom of which is provided with an outlet opening provided with a flap separating said chamber from a gate where a container removed from the feeding device, may be brought to receive a food portion as discharged by the collecting chamber, and (e) control means allowing to control the sequence of operations of the feeder device, the heating equipment, and the device for supplying containers.

Other details and features of the invention will stand out from the description, given hereinafter by way of non limitative example, of a particular embodiment of a vending machine for cooked French-fry portions, according to the invention, with reference to the accompanying drawings.

FIG. 3 is a view along line III—III in FIG. 1.

FIG. 4 is a view of a carriage and rod-crank system of the invention.

In the various figures, the same reference numerals pertain to identical or similar elements.

Figure 1:
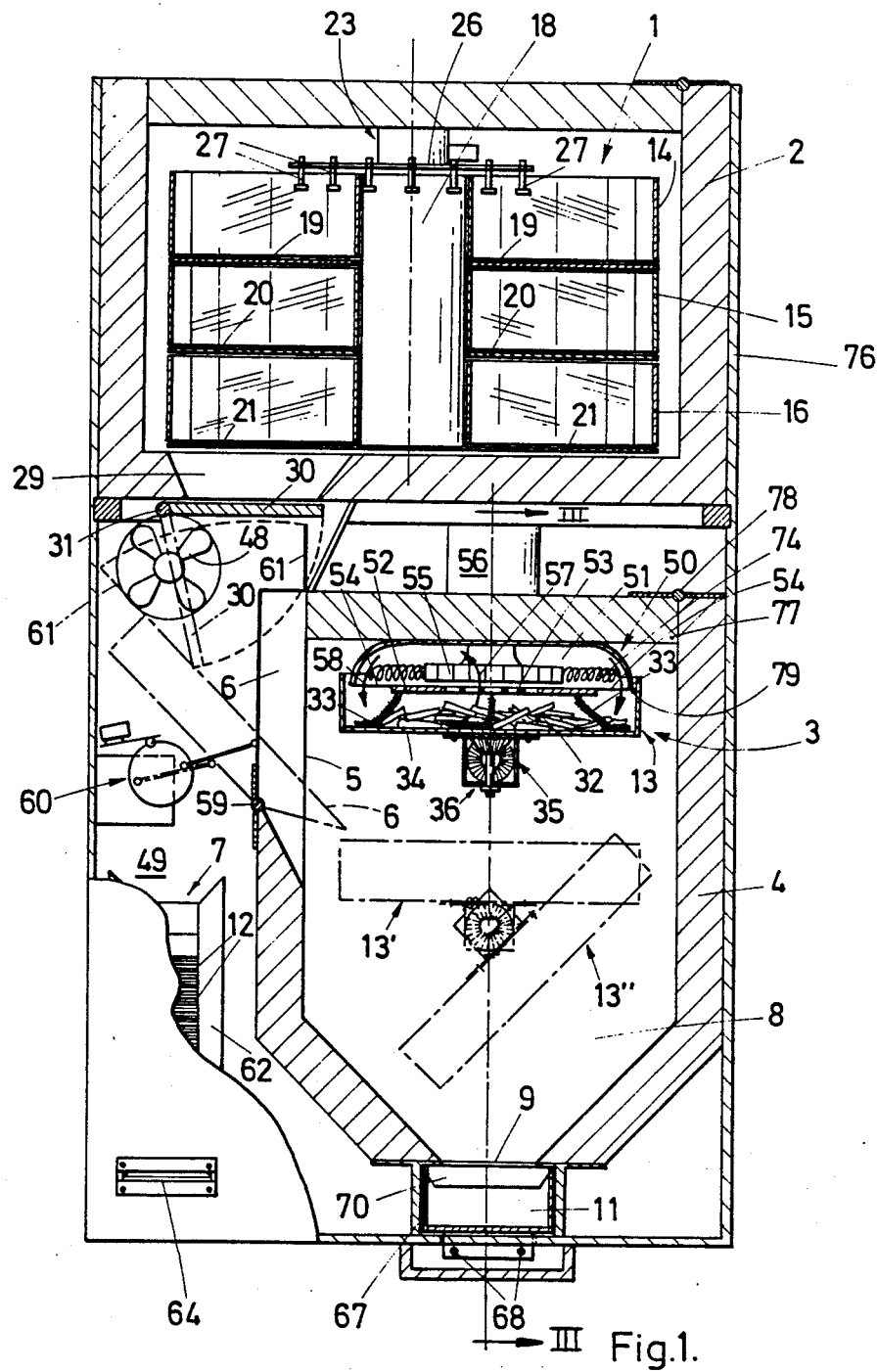
FIG. 1 is a vertical section, with parts broken-away, of this particular embodiment of a vending machine for cooked French fries.

The vending machine for French fries portions according to the invention, as shown in the figures, comprises the following four main parts:

(a) a feeder device 1 for pre-cooked French fries portions, contained inside a heat-insulated chamber 2, (b) a heating equipment 3 for said pre-cooked French fries, mounted inside an oven or cooking chamber 4 provided underneath said chamber 2 and communicating therewith through an access opening 5 provided with a closure member 6, (c) a supply device 7 for discharging containers for containing cooked French fries portions as discharged from said heating equipment 3, (d) a collecting chamber 8 in funnel shape, wherein the cooked fries are collected, provided underneath said heating equipment, said chamber having in the bottom thereof, an outlet opening 9 provided with a slide-valve 10 separating said chamber 8 from a gate 11 where a container 12, removed from the supply device 7, may be set down to receive a cooked French fries portion as discharged by said collecting chamber 8, and (e) control means, not shown and known per se, to control the sequence of operations for the feeder device 1, the heating equipment 3 and the supply device 7 for containers 12.

The feeder device 1 comprises in the embodiment as shown in FIG. 1, three co-axial storage cylinders 14, 15 and 16 open at both ends thereof and divided into a sequence of compartments 17 along substantially identical circular sectors.

Said cylinders 14, 15 and 16 are rotatable about a center vertical column 18 and bear each on a fixed disk 19, 20 and 21 respectively, forming the bottom of said compartments.

A recess 22 is provided in each said disks 19, 20 and 21, with a shape and a size substantially corresponding to those sectors defining the horizontal cross-section of said compartments.

The recesses 22 in the three disks 19, 20 and 21 accurately lie one above the other to allow forming a continuous empty cage through said three cylinders 14, 15 and 16, and thus discharging said compartments 17 by bringing same in sequence above said recesses by rotating the corresponding cylinder about the axis of column 18.

Figure 2:
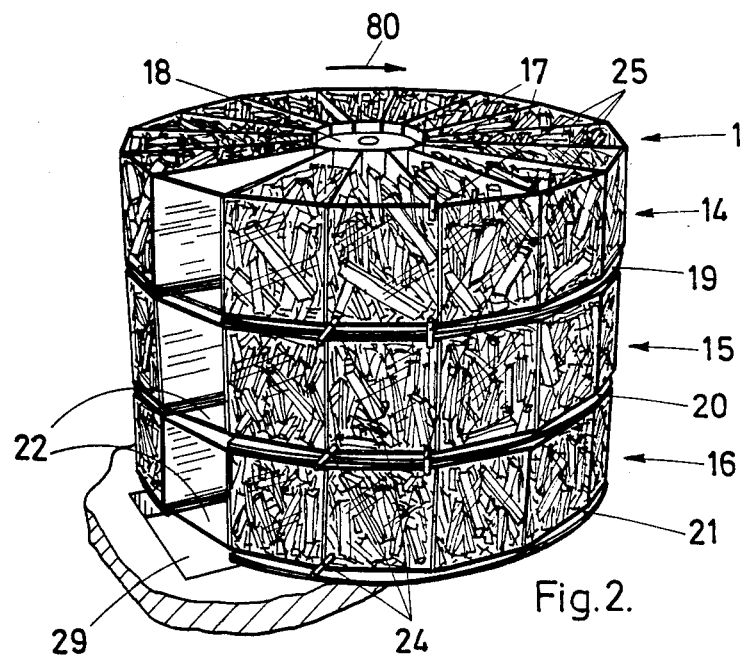
FIG. 2 is a perspective view of the feeder device of FIG. 1.

The top cylinder 14 cooperates with an operating mechanism 23 for imparting to said cylinder succeeding angular displacements over 360°/n, n being equal to the number of compartments 17, for example n=12, as in the embodiment shown clearly in FIG. 2.

Two succeeding cylinders cooperate together through driving devices, in such a way that when a cylinder has performed a complete revolution over 360° about column 18 along the direction of arrow 80, the adjacent lower cylinder be rotated together with the top cylinder, until said adjacent cylinder has performed in turn a complete revolution over 360°.

Thus the top cylinder 14 has adjacent the bottom thereof and on the outer circumference thereof, a projection 24 which abuts when said cylinder has made a complete revolution, a projection or rod 25 provided on the top outer edge of cylinder 15.

In the same way, said latter cylinder 15 has on the outer lower edge thereof, a projection 24 similar to that projection provided on cylinder 14 which allows acting on a projection or rod 25 provided on the outer edge of the lower cylinder 16 when said cylinder 15 also has performed a complete revolution about column 18.

There results from the above that when the compartments 17 to the exception of that compartment lying above recess 22, are filled, the operating mechanism 23 will first drive the top cylinder 14 to empty in sequence the compartments thereof through said cage, the other cylinders 15 and 16 remaining motionless. Thereafter the thus-emptied top cylinder 14 will drive said cylinder 15 to empty one by one the compartments thereof, and finally when said latter cylinder is empty, the bottom cylinder 16 only will be driven.

The one advantage of said device lies thus in the operating mechanism 23 never having to drive more than one cylinder the compartments 17 of which do contain French fries.

In the embodiment as shown in the figures, said operating mechanism comprises above top cylinder 14, a stepping motor 28 driving a circle-shaped plate 26 provided adjacent the circumference thereof with a series of rods 27, which are uniformly distributed over said circumference and the number of which corresponds to the number of compartments 17 in top cylinder 14.

A rod 27 enters each compartment and thus allows driving same when said plate 26 rotates about the axis of column 18.

Advantageously, at least the last compartment 17 which lies at the start above that recess 22 provided in lower disk 21, from cylinders 15 and 16, has top edges which are slightly enlarged at an angle, in such a way that the lower edges of the compartments from the upper adjacent cylinder, reach the inner side of the top edges from said latter compartment as same becomes part of said cage. In such a way there is prevented that French fries might be jammed as they move through a recess 22 between two succeeding cylinders.

Said cylinders 14, 15 and 16 as well as disks 19, 20 and 21 are removably mounted on column 18. It is thus possible to load said cylinders outside chamber 2 and to then arrange the whole unit inside said chamber.

On the other hand, to allow interchanging said cylinders 14, 15 and 16, a top projection 25 is also provided on cylinder 14, and a projection 24 on the lower edge of cylinder 16. All the cylinders are thus identical.

The recess 21 provided in the fixed bottom disk 21 lies above a hopper 29, which thus extends said cage downwards.

Said hopper is closed by a flap 30 swinging about a horizontal axis 31.

The heating equipment 3 which thus extends underneath feeder device 1 inside a oven chamber 4 bounded by insulated walls, comprises a tray 13 wherein food to be heated 32 is brought, and flexible members 33 hanging freely above said tray 13 with the lower ends thereof contacting the bottom thereof.

Means are provided to move said tray 13 and members 33 relative to one another, in such a way that the free lower ends of members 33 drag over tray bottom 34 and retain the food 32 to be heated continuously moving, while distributing, stirring and turning-over same in a substantially uniform and continuous way inside the tray. The tray is rotatably mounted about an axis substantially at right angle to the flat tray bottom, through driving mechanisms 35, while a tilting mechanism 36 allows swinging the tray about a horizontal axis while being rotated about that axis at right angle to the bottom thereof.

Moreover, means are provided to move said tray 13 away from said flexible members 33.

Said means comprise a carriage 37 mounted outside said oven chamber 4, against the one side wall thereof, and bearing said tray 13, rotating device 35 and tilting device 36.

Said carriage is driven by a rod-crank system 38 with a raising and lowering movement along said outer wall.

On the other hand, said carriage 37 and tilting mechanism 36 are so driven relative to one another that the tilting and following straightening of tray 13 occur on that moment where same lies in a position away from the flexible members 33.

The rotating mechanism 35 comprises a first bevel gear 39 integral with the bottom 34 of tray 13, meshing with a second bevel gear 40 which is then in turn driven by a motor 41 through a driving shaft 42.

The first gear which is mounted outside said tray, against the bottom 34, rotates about the axis at right angle thereto, while the driving shaft 42 whereabout the second gear 40 rotates, lies in parallel relationship with said bottom.

The tilting mechanism 36 comprises a hollow shaft 43 integral with the bottom of tray 13, inside which extends said driving shaft 42, said hollow shaft 43 also being rotated through a gear set 45.

The motors 41 and 44 as well as gear set 45, cooperating with the free end of shafts 42 and 43, are mounted on carriage 35, outside oven chamber 4.

In this regard, wall 46 has a vertical slot 47 wherethrough said shafts 42 and 43 extend.

A fan 48 is provided to blow outside cooling air into that area 49 of the vending machine which extends about oven chamber 4 and wherein the carriage 37 is thus mounted.

The flexible members 33 are comprised of flexible coil springs hanging freely by the top end thereof, some distance away from one another, above tray 13.

More particularly, a bell-shaped cover 50 is provided above the tray and the flexible members 33 hang underneath same.

A source for hot air and/or infrared radiation heating is mounted inside said cover 50, above tray 13, to heat the food 32 contained inside tray 13.

Said hot air source comprises electric resistors arranged inside a space 51 provided inside cover 50. Said space is bounded on the lower side thereof by a screen 52 having a center grid 53, a ring-shaped passageway 54 being provided between said screen and the edge of cover 50.

A fan 55 mounted inside said space 51 and driven by a motor 56 about a vertical axis, allows to suck air through the center grid 53, as shown by arrow 57, and forcing said air in tray 13 through ring-like passageway 54, as shown by arrows 58. Baffles not shown in the figures, are advantageously provided in said space about the fan to spread and distribute uniformly the hot air in the tray.

Advantageously, the inner diameter of the top portion of tray 13 is somewhat shorter than the outer diameter of cover 50, to thus allow engaging same in the top portion of tray 13, while leaving between said tray and cover, a ring-like slot 58.

This allows notably to prevent that an underpressure might be generated inside the tray during cooking.

The flexible members are hanging with the top edge thereof from the edges of screen 52.

The cover 50 together with the screen 52 thereof are fixed, while as it appears already from the above, the tray is so mounted as to be movable nearer and away relative to said cover.

The cover chamber 4, enclosing tray 13, has on the top side part thereof, an excess opening 5, as already stated hereinabove, which is provided with a closure member 6. Said closure member is comprised of a tilting flap which acts in the opening position thereof, as shown in FIG. 1, as a guideway slanting towards the tray. Said flap 6 is hinged about a horizontal axis 59 and operated through a rod-crank system 60. It does have on the top thereof, a lever 61 for retaining flap 30 in the closed position as said flap 6 lies itself in the closed position thereof.

Figure 5:
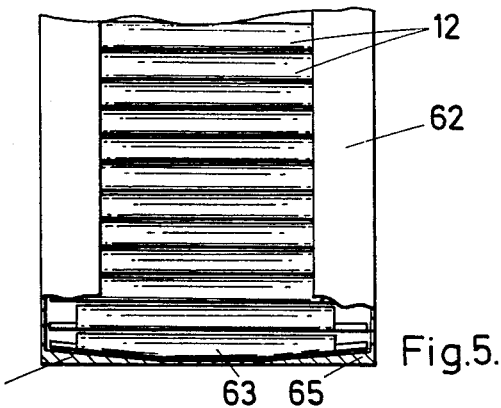
FIG. 5 is a view on a larger scale, of a detail from FIG. 1.
Figure 6:
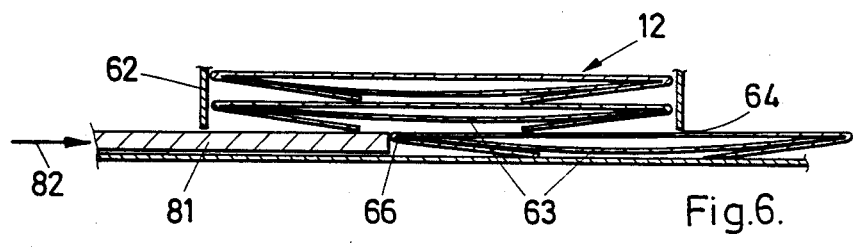
FIG. 6 is a view on a larger scale of the supply device for containers of FIG. 1.
Figure 7:
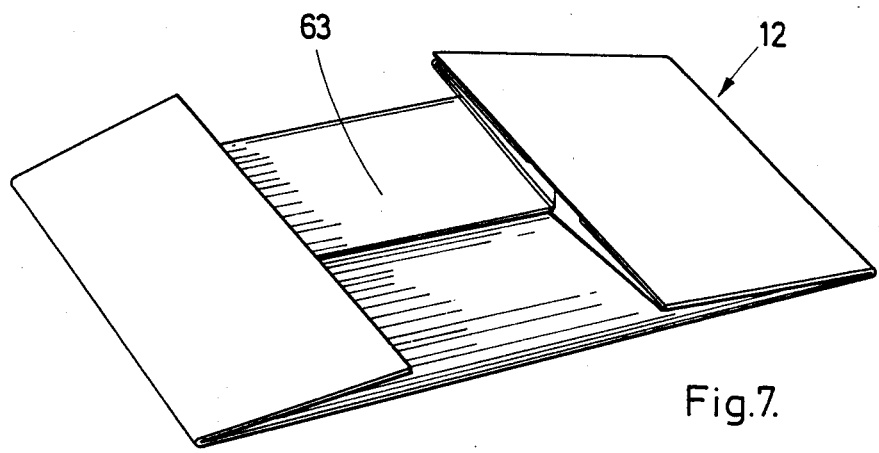
FIG. 7 is a perspective view of a folded-back container.

The supply device 7 for discharging containers 12 to contain food portions as discharged by the heating equipment 3, is arranged sidewise relative to oven chamber 4, in said area 49. Said device is shown in more detail in FIGS. 5 and 6 and comprises a storage bin 62 to enclose folded containers, the side walls of which are folded-back inwards in such a way as to comprise flat elements, that is in the shape of plates having a slightly bulging part 63 on the side of the folded walls. FIG. 7 shows such a folded-back container.

Said bin 62 has in the side wall thereof, an opening 64 wherethrough the folded containers can be removed one by one. The opening 64 is comprised of a horizontal slot the size of which does substantially correspond to the cross-section of the plate-shaped elements.

Rests 65 extend along the inner walls of bin 62 facing opening 64, whereon bear the edges 66 of that flat element to be removed, which is comprised of folded container 12. Said elements lie with the bulging part 63 thereof facing downwards, in such a way that said part comes to lie between the rests. Thus facing opening 64, the folded containers have the edge 66 thereof always at the same level to let an extractor 67 provided level with said opening 64, push the folded container therethrough by acting essentially on the edges 66 thereof bearing on said rests 65.

The gate 11 which is provided underneath collecting chamber 8, comprises a traversing support 67 whereon an unfolded container 12 may be laid.

Said support is integral with slide-valve 10 and allows bringing same in an opening position as shown in broken lines in FIG. 3, by pushing same in gate 11 along the direction of arrow 69, against the action of a spring 68. Thus when no pushing is exerted on the support in the direction of arrow 69, said latter support is automatically retained outside gate 11, with the valve 10 in the closed position thereof.

Said support has moreover on the gate side, a rim 70 angling down in hook shape, whereabove there may be engaged the front edge of an unfolded container laid on the support, which thus allows retaining said container inside the gate in a suitably-unfolded condition.

Figure 8:
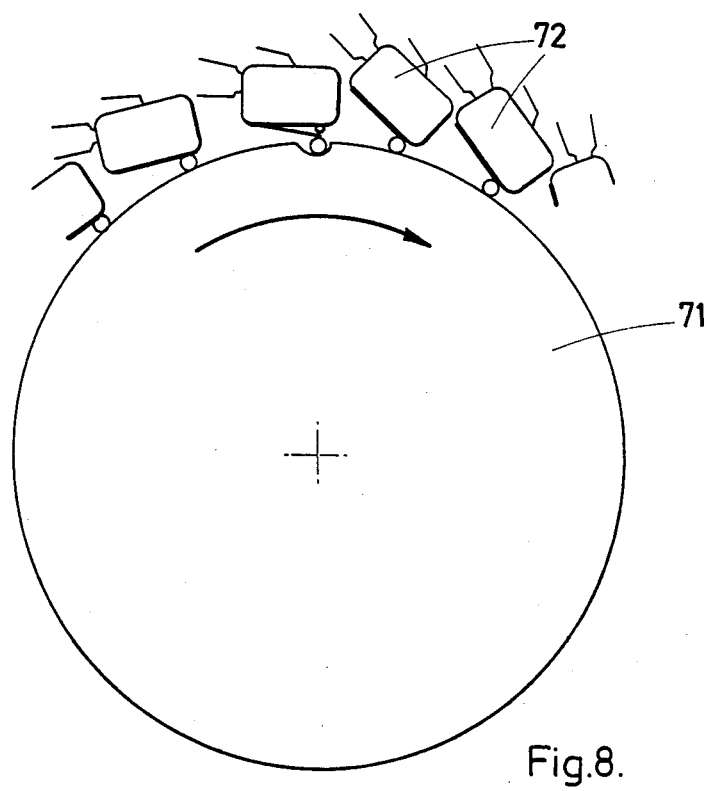
FIG. 8 is a diagrammatic view of part of the control means.

As shown diagrammatically in FIG. 8, said control means for controlling the sequence of the various machine operations according to the invention, comprise a cam 71 rotated with a substantially constant speed about the axis thereof. Said cam cooperates with a series of electric switches 72 from supply circuits not shown for said various motors.

Said switches 72 are arranged with a determined sequence and relative spacing relative to one another, as a function of the succeeding operation sequences.

Said control means may for example be triggered by putting a coin or a token in a triggering device, known per se and not shown in the figures.

The operation of the vending machine as described hereinabove and shown in the figures, occurs as follows.

After slipping in said triggering device, for example, the required coins, the stepping motor 28 moves the circle-shaped plate 26 over an angle which corresponds to the displacement of a compartment, for example from the top storage cylinder 14, when the compartments from all the cylinders have just been filled or when said cylinder 14 still has at least one full compartment.

At the same time, the motor 73 acting on the rod-crank system 60, opens flap 6, which thus also results in opening the flap 30. As in the starting position, the tray lies removed from cover 50, as shown with tray 13' in broken lines in FIG. 1, a portion of French fries then falls from feeder device 1 on flap 30 and flap 6 to slide into tray 13'.

Said tray is then raised by carriage 37 to that position as shown in solid lines in FIGS. 1 and 4, that is the cooking position.

The hot air source which has directly been started by closing the supply circuit to electric resistors 74 and operating motor 56 from fan 55, subjects the French fries to cooking for about 90 seconds.

After such cooking, the carriage 37 returns the tray to the removed position thereof, and by means of tilting mechanism 36, said tray is turned-over as shown in broken lines in FIG. 1 (reference 13").

The tray is then straightened in the removed position thereof and lies ready to receive a new portion French fries to be cooked.

It is to be noted that during all said operations, the tray is constantly kept rotating about the center axis thereof at right angle to the bottom thereof.

This does insure a direct and uniform distribution of the French fries to be cooked as soon as they are fed to the tray, and a fast and efficient discharge of the cooked French fries as the tray is tilted.

It goes without saying, as already stated hereinabove, that said rotating also occurs when the tray lies in the cooking position thereof, where the French fries are continuously stirred by the springs which drag over the rotating tray bottom.

The cooked French fries are collected in the bottom of collecting chamber 8 in the wall of which an opening 75 is provided to thus allow observing the moment where the French fries are being discharged.

As the vending machine is being triggered, the feeder device 7 allows to remove with a push-rod 81 being moved in the direction of arrow 82, a folded container 12 through that slot 64 provided in the front side of the machine, next to gate 11. Said folded container does for example contain a dressing bag, a salt bag and a small plastic fork, not shown.

During the cooking of the French fries, it is then possible to unfold container 12, remove the dressing and salt bags and the fork, and to locate said container on support 67 in front of the gate opening, taking care to locate the top container edge underneath rim 70.

As soon as one notices thus the French fries through window 75 in collecting chamber 8, one pushes support 67 bearing the unfolded container inside gate 11, underneath the outlet opening 9 of said chamber. The valve 10 then automatically releases said opening and the French fries may thus fall in the container.

By releasing support 30, same returns automatically under the action of spring 68, to the original position thereof in front of the gate, and the container with the French fries may be removed.

The feeder device 1, the heating equipment 3, the feeder device 7 and the collecting chamber 8 with the gate 11, are arranged inside a box 76.

The cover 50 of tray 13 is fastened to the inner side of a door 77 from heating chamber 4. Said door comprises the upper wall of the heating chamber and is hinged thereto by hinges 78. The motor 56 is provided on the outer side of said door.

It must be understood that the invention is in no way limited to the above-described embodiment and that many changes might be brought thereto without departing from the scope of the present invention. For instance, the hot air source might be combined with/or be replaced by an infrared radiation heating.

The storage cylinders might also be comprised of paddle-wheels rotatable inside a common cylinder-shaped tank, the paddle free ends then moving in this case along the inner surface of said tank.

On the other hand, the traversing movement of the tray might possibly be dispensed with. Said tray might for example swing about a horizontal axis lying outside the vertical projection thereof.

In still another embodiment, the flexible members might be mounted on a holder revolving about a vertical axis. In such an embodiment, the tray should not necessarily revolve about said vertical axis.

Instead of lowering the tray to move same away from the flexible members, said tray might be retained on a constant level and said members might for example be raised, by traversing and/or swinging about a side axis.

It is finally of importance to note that the invention is not necessarily limited to a vending machine for cooked French fries, but does extend to the processing of any kind of food, such as preparing "popcorn" or expanded corn.

The invention further covers the feeder device, the heating equipment and the supply device when being used separately from one another, or in another apparatus type than a vending machine for heated food.

Figure 9:
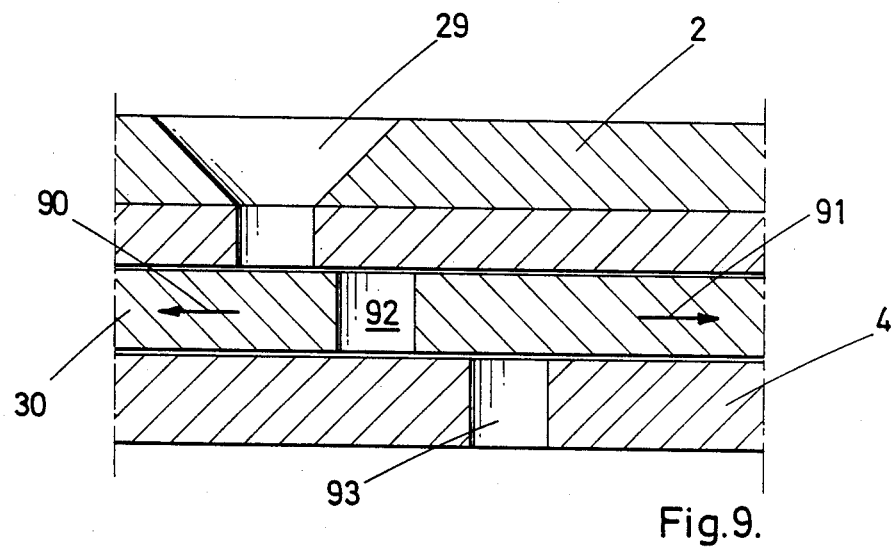
FIG. 9 is a vertical section view from part of a detail from a variation of said particular embodiment of the vending machine according to the invention.

FIG. 9 relates to a very useful variation for replacing the flap 30 for closing hopper 29.

In this embodiment, the flap is replaced by a slide-valve 30 movable to-and-fro along the direction of arrows 90 and 91 and having a cylinder-shaped passageway 92 running through said slide-valve.

Thus through said slide-valve 30, a portion food to be cooked may be conveyed horizontally along the direction of arrow 91 from hopper 29 to a similar passageway 93 provided in the top wall of cooking chamber 4 and staggered relative to hopper 29.

This is thus as it were a lock system, letting the food pass from chamber 2 to chamber 4, while insulating perfectly same from one another.

The advantage of such an embodiment lies in preventing hot gases originating from chamber 4, from escaping to chamber 2 in the feeder device 1 during the conveying of a portion food to be cooked to cooking chamber 4.

Moreover, also with the purpose of minimizing the heat loss from said cooking chamber 4, the tray 13 might advantageously be retained on a constant level, thus to the contrary of the case in the embodiment as shown in FIGS. 1, 2 and 4, and the cover 50 might be subjected to a raising opening movement. This does indeed allow avoiding the presence of slot 47 which might result in heat loss.

In this second embodiment, the shaft 36 does consequently undergo but a rotating movement about the axis thereof.

Tilting of tray 13 may for example occur at that moment where cover 50 moves away therefrom.

I claim:

1. Equipment for heating pre-cooked french fries and similar foods comprising:

at least one tray for receiving food to be heated, flexible members mounted vertically above said tray so as to have a lower free end thereof hanging freely from above said tray, said lower free ends of said flexible members being freely movably independently of one another, and means for moving the tray and the members relative to one another, whereby the lower free ends of said members are in contact with food disposed in the tray so as to maintain food thereon in continuous motion while evenly and uniformly distributing the same within the tray.

2. Equipment as defined in claim 1 wherein the tray is rotatably mounted about an axis substantially at a right angle to the bottom thereof, through a driving mechanism.

3. Equipment as defined in claim 2, wherein the tray is mounted on a tilting mechanism about a substantially horizontal axis, while cooperating with said driving mechanism, whereby the tray can undergo a rotation about the axis at a right angle to the bottom thereof during a tilting movement.

4. Equipment as defined in claim 3, further comprising a carriage bearing the tray, the rotating mechanism and the tilting mechanism, said carriage being mounted so that the tray is movable away and closer with a to-and-fro movement relative to said members.

5. Equipment as defined in claim 4, wherein the carriage and the tilting mechanism mounted thereon are driven relative to one another by the driving mechanism so that the tilting and levelling of the tray occur at that moment where said tray is moved away from said members.

6. Equipment as defined in claim 4, wherein the carriage is mounted outside a chamber enclosing the tray, a fan being provided to blow outside cooling air around said chamber.

7. Equipment as defined in claim 3, wherein the rotating mechanism comprises a gear wheel integral with the bottom of the tray and co-axial relative to said bottom, said wheel being driven by a bevel gear with an axis at right angle to an axis of the wheel, and being mounted on a driving shaft driven by a motor, the tilting mechanism comprising a hollow shaft integral with the bottom of the tray, wherein said driving shaft extends, a gear wheel being co-axially mounted on said hollow shaft and being rotated by a motor.

8. Equipment as defined in claim 1, wherein the members comprise flexible coil springs hanging freely, the top end of said springs being spaced apart from one another, above the tray.

9. Equipment as defined in claim 1, further comprising at least one of a source of hot air and a source of infrared radiation tray for heating the food contained in the tray.

10. Equipment as defined in claim 9, wherein a hot air source is mounted inside a cover for closing the tray.

11. Equipment as defined in claim 10, wherein the cover is fixed, the tray being mounted so as to be movable away and closer relative to the cover.

12. Equipment as defined in claim 11, wherein the cover can be traversed vertically, the tray being arranged so as to be retained on the same level.

13. Equipment as defined in claim 1, wherein said lower ends of the flexible members are in contact with the tray bottom.

14. An apparatus comprising, in combination, equipment for heating pre-cooked french fries and similar food including at least one tray for receiving food to be heated and flexible members each having a lower free end, said flexible members being mounted so as to hang from above said tray such that the free ends are in contact with food disposed on the tray, said lower free ends of said flexible members being freely movable independently of one another, and means for moving the tray and the members relative to one another whereby the lower free ends of the members are in contact with the food to retain the food in continuous motion while distributing the same substantially uniformly inside the tray, and a feeder device for feeding food portions to be processed, such as portions of pre-cooked French Fries to be re-heated, to the processing equipment, said feeder device including at least one storage cylinder open at both ends thereof and divided into compartments along substantially identical circular sectors, said cylinder being rotatable about a substantially vertical axis above a fixed disc forming the compartment bottom, a recess being provided in said disc to allow emptying of those compartments which contain goods, by bringing same in sequence above said recess by rotating said cylinder about the axis thereof.

15. Apparatus as defined in claim 14, wherein said feeder device includes a plurality of superimposed co-axial storage cylinders separated by said fixed disks, a recess being provided in each of said disks, the disk recesses extending above one another to define with the compartments from the various cylinders lying above said recesses, a cage through which said compartments can empty, the top cylinder cooperating with an operating mechanism for imparting to said cylinder succeeding angular displacements of 360°/n, n being equal to the number of compartments, two succeeding cylinders cooperating with one another through drive elements so that when a cylinder has performed a complete revolution over 360° about the common rotation axis, the adjacent lower cylinder will be rotated together with said cylinder until said latter one has performed in turn a complete revolution over 360°.

* * * * *